United States Patent
Kumakawa et al.

(10) Patent No.: US 8,299,580 B2
(45) Date of Patent: Oct. 30, 2012

(54) SEMICONDUCTOR WAFER AND A METHOD OF SEPARATING THE SAME

(75) Inventors: Takahiro Kumakawa, Kyoto (JP); Hideki Kojima, Niigata (JP); Tomoaki Furukawa, Niigata (JP)

(73) Assignee: Panasonic Corporation, Osaka (JP)

( * ) Notice: Subject to any disclaimer, the term of this patent is extended or adjusted under 35 U.S.C. 154(b) by 226 days.

(21) Appl. No.: 12/712,921

(22) Filed: Feb. 25, 2010

(65) Prior Publication Data

US 2010/0148315 A1    Jun. 17, 2010

Related U.S. Application Data

(63) Continuation of application No. PCT/JP2009/002127, filed on May 14, 2009.

(30) Foreign Application Priority Data

Oct. 31, 2008   (JP) ................................ 2008-281107

(51) Int. Cl.
*H01L 23/544* (2006.01)

(52) U.S. Cl. ........ 257/620; 257/777; 257/737; 257/383; 257/797; 438/113; 438/462; 438/460; 438/459; 438/456

(58) Field of Classification Search .................. 257/620, 257/777, 737, 383, 48, 797; 438/113, 462, 438/460, 27, 459, 456, 68, 330, 463, 106, 438/118, 125, 132, 197, 464

See application file for complete search history.

(56) References Cited

U.S. PATENT DOCUMENTS

| | | | |
|---|---|---|---|
| 4,804,641 | A | 2/1989 | Arlt et al. |
| 7,279,775 | B2 | 10/2007 | Kim et al. |
| 2004/0002199 | A1 | 1/2004 | Fukuyo et al. |
| 2005/0116333 | A1 | 6/2005 | Akiyama |
| 2005/0199592 | A1 | 9/2005 | Iri et al. |
| 2005/0236700 | A1* | 10/2005 | Ghyselen et al. ............. 257/676 |
| 2006/0163699 | A1 | 7/2006 | Kumakawa et al. |
| 2007/0287215 | A1* | 12/2007 | Utsumi et al. .................. 438/51 |
| 2008/0305615 | A1 | 12/2008 | Ueno et al. |
| 2009/0218660 | A1* | 9/2009 | Utsumi et al. ................ 257/620 |
| 2010/0015782 | A1* | 1/2010 | Yu et al. ........................ 438/463 |
| 2010/0019354 | A1* | 1/2010 | Farooq et al. ................. 257/620 |
| 2010/0022046 | A1* | 1/2010 | Utsumi et al. .................. 438/51 |
| 2010/0144093 | A1* | 6/2010 | Viswanadam ................ 438/109 |

FOREIGN PATENT DOCUMENTS

| | | |
|---|---|---|
| JP | 62-81729 | 4/1987 |
| JP | 10-116801 | 5/1998 |
| JP | 11-079770 | 3/1999 |
| JP | 2002-192370 | 7/2002 |
| JP | 2002-205180 | 7/2002 |
| JP | 2003-088980 | 3/2003 |
| JP | 2005-268752 | 9/2005 |
| WO | WO 2006/070825 A1 | 7/2006 |

* cited by examiner

*Primary Examiner* — Telly Green
(74) *Attorney, Agent, or Firm* — McDermott Will & Emery LLP

(57) ABSTRACT

A semiconductor wafer includes a plurality of predetermined separation lines extending from an upper surface to a bottom surface; and a semiconductor substrate including a plurality of chip regions segmented by the predetermined separation lines. Tensile stress is applied to regions of the semiconductor substrate provided with the predetermined separation lines.

11 Claims, 3 Drawing Sheets

SEMICONDUCTOR WAFER AND A METHOD OF SEPARATING THE SAME

CROSS-REFERENCE TO RELATED APPLICATION

This is a continuation of PCT International Application PCT/JP2009/002127 filed on May 14, 2009, which claims priority to Japanese Patent Application No. 2008-281107 filed on Oct. 31, 2008. The disclosures of these applications including the specifications, the drawings, and the claims are hereby incorporated by reference in its entirety.

BACKGROUND

The present disclosure relates to semiconductor wafer structures suitable for laser processing for separating into individual semiconductor devices.

Conventionally, blade dicing has been the most generally used method of dicing semiconductor wafers. In the blade dicing, a ring-shaped dicing saw, which holds particles of diamond and cubic boron nitride (CBN) using a bonding material, is rotated at high speed to break a wafer along a dicing lane (the actual dicing width of the dicing saw) as an area needed for separating the wafer.

In a dicing technique using a dicing saw, processing quality has been improved by improving and optimizing a specification of the dicing saw such as a size and density of a diamond particle, and a bonding material; and an operational condition such as rotation speed, feed speed, and cutting depth.

However, there are limits on improvements in quality of processing with a dicing saw. Further improvements cannot be expected in breaking wafers with a dicing saw, particularly because of the following problems.

(1) The breaking causes chipping on a cutting plane to reduce breaking strength of semiconductor devices after dicing.

(2) A fragment of chipping reduces as dust, process yields and reliability of the devices after dicing.

(3) The dicing saw generally needs to have a thickness of 20 μm or more to maintain the mechanical strength. A scribe region needs to be larger than the actual dicing width so that the chipping does not enter the region for the semiconductor elements.

(4) Water is used during the processing such as cooling a wafer to reduce heat generation caused by breaking, and washing the wafer to remove dicing dust. Thus, the dicing technique using a saw cannot be used for a water sensitive device such as a micro electro mechanical system (MEMS).

In recent years, as solution to the above problems, much attention has been paid to processing with laser light. For example, Japanese Patent Publication No. 2002-192370 describes a technique for forming a modified region in an object by multiphoton absorption. The multiphoton absorption is the phenomenon, in which light absorption occurs in a material because of a significant increase in intensity of light, even when energy of photons is smaller than the band gap of the light absorption, i.e., when the material is optically transparent. In this method, laser light is focused on the inside of the semiconductor wafer to cause multiphoton absorption, thereby forming the modified region inside the semiconductor wafer. Then, a crack is grown along a predetermined separation line from the modified region as a starting point to separate the semiconductor wafer. This enables dicing of the semiconductor wafer without generating any undesired crack, i.e., chipping, outside the predetermined separation line. Therefore, the conventional method reduces the dust, and the breaking strength caused by chipping. Unlike a breaking technique, dicing with laser light does not require physical cutting width in a planar direction. This leads to significant reduction in the area of the dicing region. Furthermore, water is not required, since the dicing does not cause dust and heat generation in the processing. Therefore, the dicing is suitable for processing of a water sensitive device.

In the case of a thick semiconductor wafer as described in Japanese Patent Publication No. 2002-205180, the depth of the focal point is changed to form a plurality of modified regions at various depths in the semiconductor wafer. Cracks generated from the respective modified regions are connected to each other, thereby enabling the separation of the wafer. At this time, with an increase in the thickness of the semiconductor wafer, an increasing number of modified regions are needed, thereby requiring more time for processing. When distances between the modified regions are set long to reduce the number of the modified regions, or when there is a long distance from the modified regions to a surface of the semiconductor wafer; reliable separation cannot be expected and non-separated parts are formed. Even if separation is performed, propagation linearity of the cracks are degraded. This results in deterioration of propagation linearity in the semiconductor surface.

Japanese Patent Publication No. 2003-88980, for example, describes a method of growing cracks with fewer modified regions to reliably separate a semiconductor wafer. In this publication, after forming the modified regions, the semiconductor wafer is cooled, and thermal stress is applied to the wafer to grow the cracks of the modified regions. Japanese Patent Publication No. 2005-268752, for example, describes a method of improving propagation linearity of cracks. In the method, a surface of a semiconductor wafer is scratched to form a recess, and a crack from a modified region is guided to the recess to enable separation with propagation linearity.

SUMMARY

However, the above publications have the following problems.

First, in the method of Japanese Patent Publication No. 2003-88980, the cracks are grown after forming the modified regions. This requires an extra step of applying thermal stress, and extra equipment for controlling heat. When the distance from the modified regions to the surface of the semiconductor wafer is long, the propagation linearity on the surface of the semiconductor wafer are degraded.

In the method described in Japanese Patent Publication No. 2005-268752, the direction of the cracks can be controlled. However, when the number of the modified regions is reduced, a specified step and equipment for separation are needed as shown in Japanese Patent Publication No. 2003-88980.

In a semiconductor wafer according to an example embodiment of the present disclosure, even when the semiconductor wafer is thick, the number of the modified regions can be reduced, and separation having propagation linearity can be performed.

In order to address the above-described problems, the semiconductor wafer according to an example of the present invention, where a plurality of predetermined separation lines are provided, includes a semiconductor substrate including a plurality of chip regions segmented by the predetermined separation lines. Tensile stress is applied to regions of the semiconductor substrate provided with the predetermined separation lines.

In this structure, the tensile stress is applied to portions provided with the predetermined separation lines near an upper or lower surface of the semiconductor substrate. This secures propagation linearity of cracks when dicing the wafer with laser light, and reduces chipping. Therefore, even a thick semiconductor substrate can be separated without disadvantages.

In particular, the wafer preferably includes a first stress applying layer, which is formed on the upper surface or the back surface of the semiconductor substrate and on both sides of each of the predetermined separation lines including a space, and applies compressive stress to the semiconductor substrate, which is in contact with the first stress applying layer. The tensile stress can be effectively applied to parts of the semiconductor substrate, which are provided with the predetermined separation lines. Furthermore, the first stress applying layer can be formed during a manufacturing process of a conventional semiconductor device. This does not require any extra step in the manufacturing process or specific equipment.

A method of separating a semiconductor wafer according to an example of the present invention includes the steps of (a) preparing a wafer; in which a plurality of predetermined separation lines are provided, which includes a semiconductor substrate including a plurality of chip regions segmented by the predetermined separation lines, and in which tensile stress is applied to regions of the semiconductor substrate provided with the predetermined separation lines; (b) irradiating with laser light, an inside of the semiconductor substrate along the predetermined separation lines to form a plurality of modified regions in a depth direction; and (c) separating the semiconductor substrate into the individual chip regions along cracks generated from the modified regions.

In this method, less chipping occurs, and a scribe line has a smaller width than in a method using a dicing saw. Even when the distances between the modified regions formed by laser light are large, propagation linearity of the cracks can be secured to reduce disadvantages when separating the semiconductor wafer.

In the semiconductor wafer according to an example of the present disclosure, tensile stress is applied to the predetermined separation lines. This easily grows the cracks generated when forming the modified regions inside the semiconductor wafer. Even a thick semiconductor wafer can be easily separated. Even when the number of the modified regions to be formed is reduced, more reliable separation can be performed than in a conventional method.

DETAILED DESCRIPTION

Embodiments of a semiconductor wafer of the present disclosure will be described hereinafter with reference to the drawings.

First Embodiment

Figure 1:
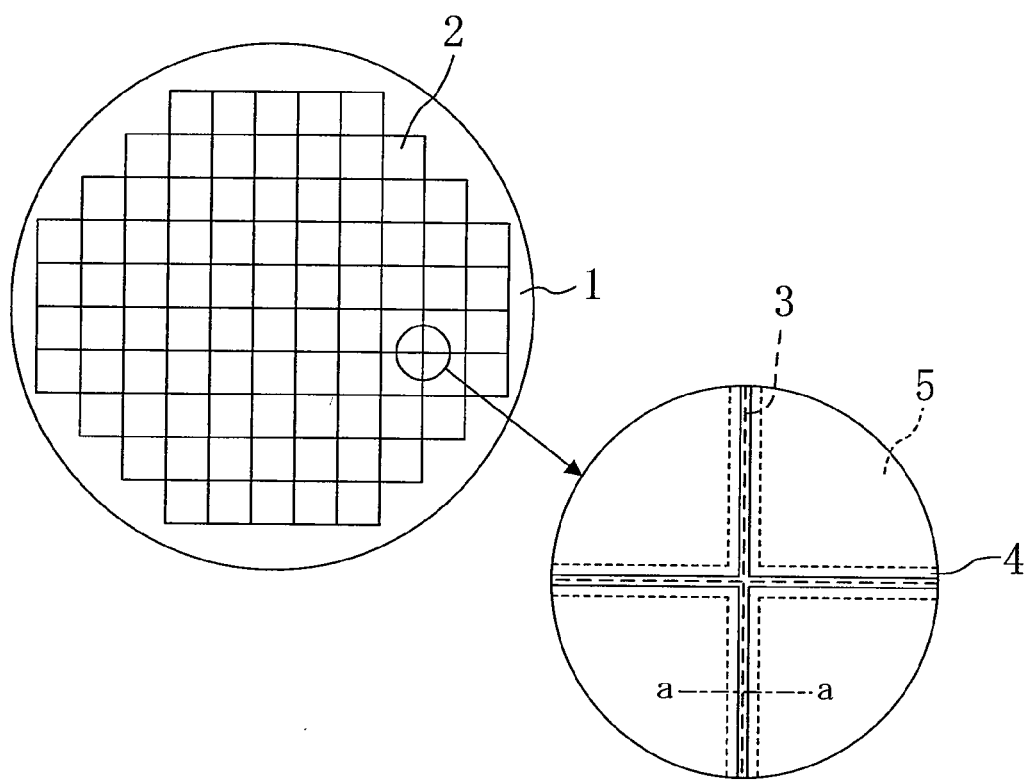
FIG. 1 provides a plan view illustrating predetermined separation lines of a semiconductor wafer, and an enlarged view of the predetermined separation lines.
Figure 2:
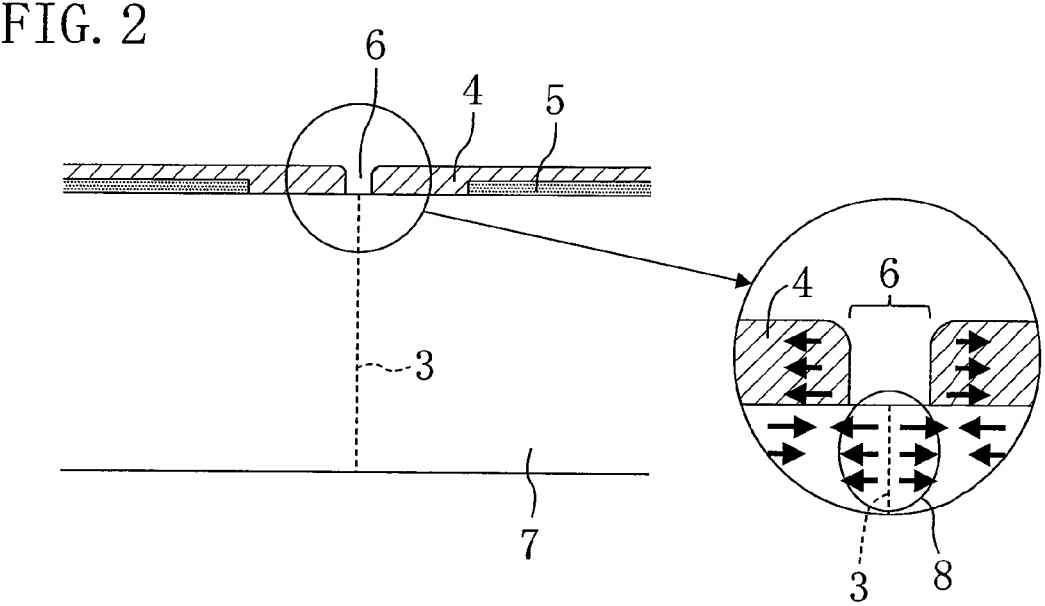
FIG. 2 provides a cross-sectional view of a semiconductor wafer according to a first embodiment, and an enlarged partial cross-sectional view of a semiconductor device.

FIG. 1 provides a plan view illustrating predetermined separation lines of a semiconductor wafer, and an enlarged view of the predetermined separation lines. FIG. 2 provides a cross-sectional view of a semiconductor wafer according to a first embodiment, and an enlarged partial cross-sectional view of a semiconductor device.

As shown in FIGS. 1 and 2, a semiconductor wafer 1 of this embodiment includes a plurality of predetermined separation lines 3, which are arranged from an upper surface to a lower surface of the wafer. The semiconductor wafer 1 also includes a plurality of chip regions (semiconductor devices 2) segmented by the predetermined separation lines 3. The semiconductor wafer 1 further includes a semiconductor substrate 7; a circuit formation layer 5, which is provided in each of the individual semiconductor devices 2, provided with a transistor or the like, and formed on an upper surface of the semiconductor substrate 7; and a tensile stress layer (a first stress applying layer) 4, which is formed on the circuit formation layer 5 and the semiconductor substrate 7, and provided with a trench-like opening (a slit 6) on each of the predetermined separation lines 3. The semiconductor wafer 1 is separated into the individual semiconductor devices 2 along the predetermined separation lines 3.

The tensile stress layer 4 applies compressive stress caused by reaction force to a part of the semiconductor substrate 7, which is in contact with the tensile stress layer 4. This forms a tensile stress field 8 under the slit 6, i.e., around each of the predetermined separation lines 3 in the semiconductor substrate 7. When the semiconductor substrate 7 is made of Si, the tensile stress layer 4 is made of, for example, an organic material such as SiN and polyimide, which can be formed in a conventional semiconductor manufacturing process. The tensile stress layer 4 is preferably transparent to laser light, but may not be necessarily transparent to laser light as described below. The laser light used for dicing preferably has a near-infrared wavelength (0.7-2.5 μm), at which the laser light is transparent, e.g., to Si; and most preferably at around 1.0 μm.

Figure 3:
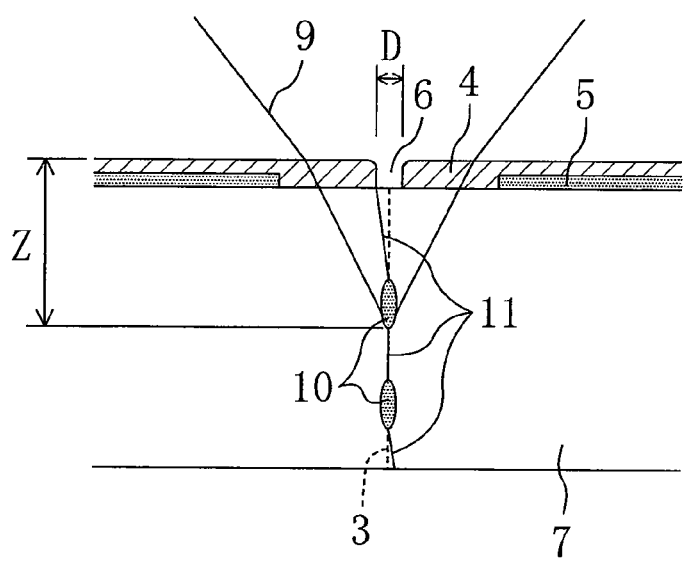
FIG. 3 is a cross-sectional view illustrating a process of dicing the semiconductor wafer according to the first embodiment with laser light.

FIG. 3 is a cross-sectional view illustrating a process of dicing the semiconductor wafer according to this embodiment with laser light. When the tensile stress layer 4 is made transparent to laser light 9; the laser light 9 is, as shown in FIG. 3, incident from the side of the circuit formation layer 5, and focused on the inside of the semiconductor substrate 7 to form modified regions 10. From the modified regions 10 as starting points, cracks 11 are grown to separate the semiconductor wafer 1 into the individual semiconductor devices 2. At this time, the smaller the width of the slit 6 is, the more regionally the tensile stress field 8 can be formed. This accelerates the growth of the cracks 11 toward the upper surface of the semiconductor substrate 7, and enables control on the growth direction of the cracks 11. According to an experiment of the present inventors, when the tensile stress field 8 is formed around each of the predetermined separation lines 3; a depth (referred to as Z), at which the modified region 10 nearest to the surface (upper surface) of the semiconductor substrate 7 is formed, needs to be set about 30-100 μm to grow the cracks on the surface of the semiconductor substrate 7. The depth Z can be set about 40-150 μm by forming the tensile stress field 8 around the each of the predetermined separation lines 3. The width of the slit 6 in the tensile stress layer 4 can affect collection of the laser light 9, depending on the thickness or optical physical properties, and is thus preferably small. According to the experiment of the present inventors, where the width of the slit 6 is D, formation of a modified region 10 is affected at the depth Z, which is about 5D. That is, by setting the slit width D to 30 μm or smaller, the modified region 10 can be formed at Z (depth of 40-150 μm), which is suitable for growing the cracks without being affected by the slit 6.

Furthermore, in FIG. 3, the laser light 9 is incident from the surface provided with the circuit formation layer 5. When the tensile stress layer 4 is not transparent to the laser light 9, the laser light 9 may be incident from a back surface of the semiconductor substrate 7 (i.e., the surface facing the surface provided with the circuit formation layer 5).

As described above, in dicing with laser light using the semiconductor wafer 1 in this embodiment, the semiconductor wafer 1 can be reliably separated without sacrificing propagation linearity of the cracks 11, even when the number of the modified regions 10 in a depth direction is minimized. Thus, even when the semiconductor wafer 1 is thick, the semiconductor wafer 1 can be reliably separated in a relatively short processing time with a high yield. Furthermore, with the use of laser light, the method can be used for manufacturing water sensitive semiconductor devices, while reducing chipping. Each of the predetermined separation lines (scribe lines) 3 has a smaller width than in a method using a dicing saw.

Moreover, the tensile stress layer 4 used in the semiconductor wafer 1 of this embodiment is a layer for various purposes such as stress application or etching stop in the semiconductor devices 2. This enables an improvement in reliability of separation of the semiconductor wafer 1 without adding any extra manufacturing step or equipment.

Second Embodiment

Figure 4:
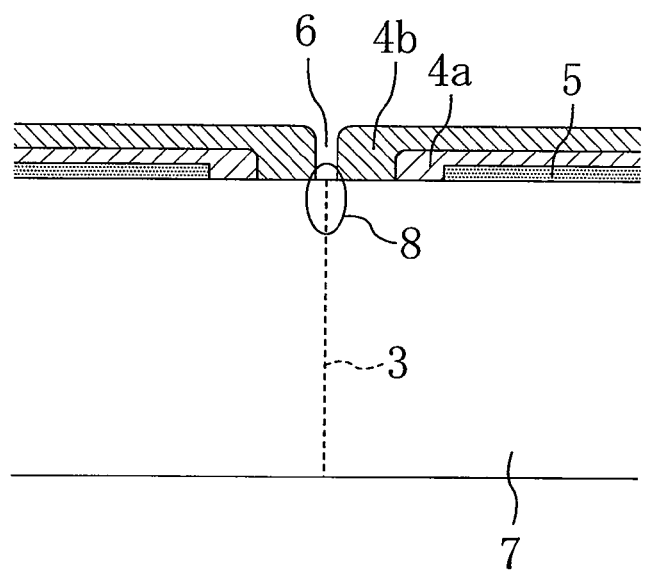
FIG. 4 is a cross-sectional view of a semiconductor wafer according to a second embodiment.

FIG. 4 is a cross-sectional view of a semiconductor wafer according to a second embodiment. The figure is the cross-sectional view taken along the line a-a in FIG. 1.

The semiconductor wafer 1 in this embodiment includes, as the semiconductor wafer in the first embodiment does, a plurality of predetermined separation lines 3; and a plurality of semiconductor devices 2 segmented by the predetermined separation lines 3.

In the semiconductor wafer 1 of this embodiment, as shown in FIG. 4, a tensile stress layer includes a plurality of layers, for example, a first tensile stress layer 4a formed on a circuit formation layer 5, and a second tensile stress layer 4b formed on the first tensile stress layer 4a. The first tensile stress layer 4a and the second tensile stress layer 4b apply compressive stress to the semiconductor substrate 7, which is in contact with the layers. The first tensile stress layer 4a and the second tensile stress layer 4b are formed of organic layers made of, for example, SiN and polyimide. Since the tensile stress layer includes a plurality of layers, tensile stress applied to a tensile stress field 8 under a slit 6 can be further increased.

Third Embodiment

Figure 5:
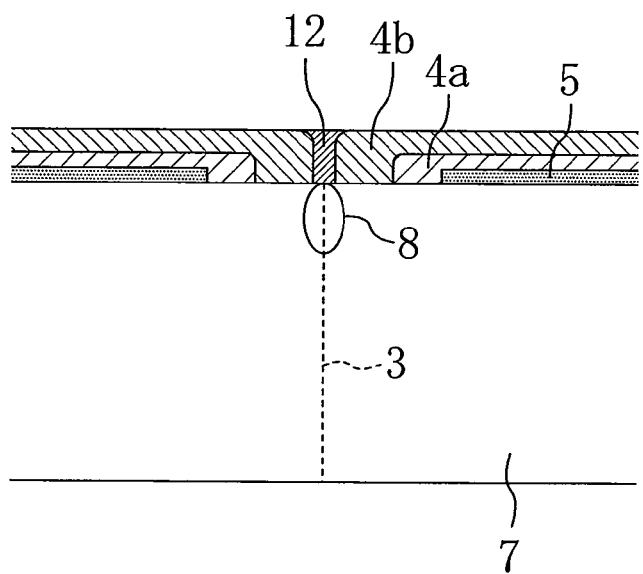
FIG. 5 is a cross-sectional view of a semiconductor wafer according to a third embodiment.

FIG. 5 is a cross-sectional view of a semiconductor wafer according to a third embodiment. The figure is the cross-sectional view taken along the line a-a in FIG. 1.

As shown in FIG. 5, the semiconductor wafer of this embodiment is similar to the semiconductor wafer according to the second embodiment shown in FIG. 4. A slit 6, which is formed on each of predetermined separation lines 3 by a second tensile stress layer 4b, is filled with a compressive stress layer 12.

The compressive stress layer 12 applies tensile stress to a semiconductor substrate 7 on the predetermined separation lines 3, which is in contact with the layer. This further increases tensile stress applied to a tensile stress field 8.

When the semiconductor substrate 7 is made of Si, the compressive stress layer 12 is, for example, a polycrystalline Si layer. The compressive stress layer 12 is, as the first tensile stress layer 4a and the second tensile stress layer 4b are, a layer used for the semiconductor devices. This enables an improvement in reliability of separation of the semiconductor wafer without adding any extra manufacturing step.

FIG. 5 illustrates an example, in which the semiconductor wafer according to the second embodiment includes the compressive stress layer 12. Similar advantages can be provided, when the semiconductor wafer according to the first embodiment includes the compressive stress layer 12.

In the semiconductor wafer of the above-described embodiments, the tensile stress layer 4, the first tensile stress layer 4a, the second tensile stress layer 4b, and the compressive stress layer 12 may be removed by plasma etching, chemical etching, or a remover, after separating the semiconductor substrate 7. When the tensile stress layer 4, the first tensile stress layer 4a, the second tensile stress layer 4b, and the compressive stress layer 12 are removed, disadvantages in the separated semiconductor devices such as curving of the semiconductor substrate can be reduced.

While the tensile stress layer 4 is formed on the circuit formation layer 5, the circuit formation layer 5 itself may have the function of applying compressive stress, as the tensile stress layer 4 does; thereby applying tensile stress to the predetermined separation lines 3 in the semiconductor substrate 7.

While the tensile stress layer 4 and the compressive stress layer 12 are formed on the semiconductor substrate 7 near the circuit formation layer 5, similar advantages can be obtained, when they are formed on the back surface of the semiconductor substrate 7 (i.e., the surface facing the surface provided with the circuit formation layer 5). Tensile stress layers may be formed on both of the upper surface and back surface of the semiconductor substrate 7.

The material of the semiconductor substrate 7 is not limited to Si, but may be compound semiconductor such as SiGe and GaAs.

Even when the compressive stress layer 12 is formed on each of the predetermined separation lines 3 without providing the tensile stress layer, the semiconductor substrate 7 can be easily separated.

As described above, the semiconductor wafer according to an example of the present disclosure is used for all of semiconductor devices used in the form of separated chips, as well as for electronics using such semiconductor devices.

What is claimed is:

1. A semiconductor wafer, where a plurality of predetermined separation lines are provided, comprising:
   a semiconductor substrate including a plurality of chip regions segmented by the predetermined separation lines, wherein:
   a first stress applying layer is formed on an upper surface of the semiconductor substrate so as to be disposed on both sides of each of the predetermined separation lines, said first stress applying layer having an opening above each of said predetermined separation lines, said first stress applying layer applying compressive stress to the semiconductor substrate which is in contact with the first stress applying layer, a circuit formation layer is formed on the semiconductor substrate in each of the chip regions, and the first stress applying layer is provided from a top surface of the circuit formation layer to a top surface of the semiconductor substrate.

2. The semiconductor wafer of claim 1, wherein the first stress applying layer includes a plurality of layers.

3. The semiconductor wafer of claim 1, wherein the first stress applying layer is transparent to laser light.

4. The semiconductor wafer of claim 1, wherein space between adjacent first stress applying layers has a width of 30 μm or less.

5. The semiconductor wafer of claim 1, wherein at least one part of the first stress applying layer is made of SiN.

6. The semiconductor wafer of claim 1, wherein the circuit formation layer applies compressive stress to the semiconductor substrate, which is in contact with the circuit formation layer.

7. The semiconductor wafer of claim 1, wherein the wafer further includes a second stress applying layer formed on the upper surface of the semiconductor substrate provided with the predetermined separation lines, filling a space between adjacent first stress applying layers, and applying tensile stress to the semiconductor substrate, which is in contact with the second stress applying layer.

8. A method of separating a semiconductor wafer comprising the steps of:

(a) preparing a wafer; in which a plurality of predetermined separation lines are provided, which includes a semiconductor substrate including a plurality of chip regions segmented by the predetermined separation lines, and in which tensile stress is applied to regions of the semiconductor substrate provided with the predetermined separation lines;

(b) irradiating with laser light, an inside of the semiconductor substrate along the predetermined separation lines to form a plurality of modified regions in a depth direction; and (c) separating the semiconductor substrate into the individual chip regions along cracks generated from the modified regions, wherein the semiconductor wafer includes a first stress applying layer formed on an upper surface or a back surface of the semiconductor substrate and on both sides of the predetermined separation lines including a space, and applying compressive stress to the semiconductor substrate, which is in contact with the first stress applying layer, a circuit formation layer is formed on the semiconductor substrate in each of the chip regions, and the first stress applying layer is provided from a top surface of the circuit formation layer to a top surface of the semiconductor substrate.

9. The method of claim 8, further comprising the step (d) removing the first stress applying layer after the step (c).

10. The method of claim 8, wherein the circuit formation layer applies compressive stress to the semiconductor substrate, which is in contact with the circuit formation layer.

11. The method of claim 8, wherein the wafer further includes a second stress applying layer formed on the upper surface of the semiconductor substrate provided with the predetermined separation lines, filling a space between adjacent first stress applying layers, and applying tensile stress to the semiconductor substrate, which is in contact with the second stress applying layer.

* * * * *